(12) United States Patent
Kraft et al.

(10) Patent No.: US 8,612,403 B2
(45) Date of Patent: Dec. 17, 2013

(54) METHOD AND SYSTEM FOR PROVIDING CONTACT SPECIFIC DELIVERY REPORTS

(75) Inventors: Christian Kraft, Frederiksberg (DK); Peter Dam Nielsen, Kga Lyngby (DK)

(73) Assignee: Uniforce Tech Limited Liability Company, Dover, DE (US)

( * ) Notice: Subject to any disclaimer, the term of this patent is extended or adjusted under 35 U.S.C. 154(b) by 422 days.

(21) Appl. No.: 11/618,011

(22) Filed: Dec. 29, 2006

(65) Prior Publication Data

US 2008/0162645 A1 Jul. 3, 2008

(51) Int. Cl.
*G06F 17/30* (2006.01)

(52) U.S. Cl.
USPC .......................................... 707/694

(58) Field of Classification Search
None
See application file for complete search history.

(56) References Cited

U.S. PATENT DOCUMENTS

| | | | |
|---|---|---|---|
| 5,917,489 A | 6/1999 | Thurlow et al. | |
| 6,108,688 A * | 8/2000 | Nielsen | 709/206 |
| 6,999,993 B1 | 2/2006 | Shah et al. | |
| 2002/0021307 A1* | 2/2002 | Glenn et al. | 345/753 |
| 2005/0033845 A1* | 2/2005 | Perepa et al. | 709/226 |
| 2005/0135681 A1* | 6/2005 | Schirmer | 382/229 |
| 2005/0275878 A1* | 12/2005 | Hiatt et al. | 358/1.15 |
| 2007/0100991 A1* | 5/2007 | Daniels et al. | 709/224 |
| 2007/0143417 A1* | 6/2007 | Daigle | 709/206 |

OTHER PUBLICATIONS

Mozilla Thunderbird Tutorial. "Thunderbird's Email Account Settings: Return Receipt Settings." May 12, 2006. http://web.archive.org/web/20060512004933/http://www.freeemailtutorials.com/mozillaThunderbird/return Receipts Emails.cwd.*
Experts-Exchange2. "Read/reception receipts." Feb. 6, 2003. N.p., Online Posting to Experts Exchange. Web. Apr. 5, 2013. <http://www.experts-exchange.com/Software/Office_Productivity/Groupware/Outlook/Q_20500334.html>.*
Experts-Exchange. "Request Confirmation for selected Contacts." Aug. 7, 2003. N.p., Online Posting to Experts Exchange. Web. Apr. 5, 2013. <http://www.experts-exchange.com/Software/Office_Productivity/Groupware/Outlook/Q_20702890.html>.*
PC Review. "Exclude Certain Recipients from Read Receipt." Oct. 25, 2004. N.p., Online Posting to PC Review. Web. Apr. 5, 2013. <http://www.pereview.co.uk/forums/exclude-certain-recipients-read-receipt-t796634.html>.*
Pittnet. "Creating Rules in Outlook 2003." 2003. Web. Apr. 5, 2013. <http://www.technology.pittedu/Documents/emailaccounts/accessing-email/outlook/Creating%20Rules%20in%20Uutlook%202003.pdf>.*
International Search Report dated Jun. 13, 2008.

* cited by examiner

*Primary Examiner* — Syed Hasan
(74) *Attorney, Agent, or Firm* — Novak Druce Connolly Bove + Quigg LLP (57) ABSTRACT

A method includes selecting a contact for receiving a message from a computing device, and determining delivery report options individually for the selected contact, where the delivery report options are maintained for each message sent to the contact regardless of a global setting for delivery reports in the computing device.

30 Claims, 9 Drawing Sheets

FIG. 8

METHOD AND SYSTEM FOR PROVIDING CONTACT SPECIFIC DELIVERY REPORTS

BACKGROUND

1. Field

The disclosed embodiments generally relate to communications among users of computing devices, and in particular to communication delivery reports.

2. Brief Description of Related Developments

A user of a computing device such as a personal computer or a mobile device may need to know if a particular message has been delivered, that is, has been sent to the computing device utilized by the recipient. The user may also need to know if the recipient's computing device is switched on or if the recipient is available, especially for communicating with overseas contacts.

Message delivery reports may be generated upon a computing device receiving a message or becoming available. These reports are usually enabled by the sending device. However, switching delivery reports on and off is extremely cumbersome in today's applications and the options are typically hidden deep within a menu hierarchy. In addition, delivery reports are generally set on a global basis, that is, for all messages or for none of the messages. For example, a computing device may have only two delivery report settings, either on for all messages or off for all messages. Thus, a user may receive delivery reports for every single message sent unless the user navigates a number of menus to switch delivery reports on and off between sending messages to different persons or devices. Such navigation may be difficult and tedious, and may requires a significant amount of keypresses on the device.

SUMMARY

In one embodiment, a method includes selecting a contact for receiving a message from a computing device, and determining delivery report options individually for the selected contact, where the delivery report options are maintained for each message sent to the contact regardless of a global setting for delivery reports in the computing device.

In another embodiment, an apparatus includes a messaging client for defining a contact for receiving messages from a computing device, a display for providing delivery report options individually for the contact, and a computing device for maintaining the delivery report options for the contact regardless of a global setting for delivery reports in the computing device.

BRIEF DESCRIPTION OF THE DRAWINGS

The foregoing aspects and other features of the presently disclosed embodiments are explained in the following description, taken in connection with the accompanying drawings, wherein.

DETAILED DESCRIPTION

Figure 1:
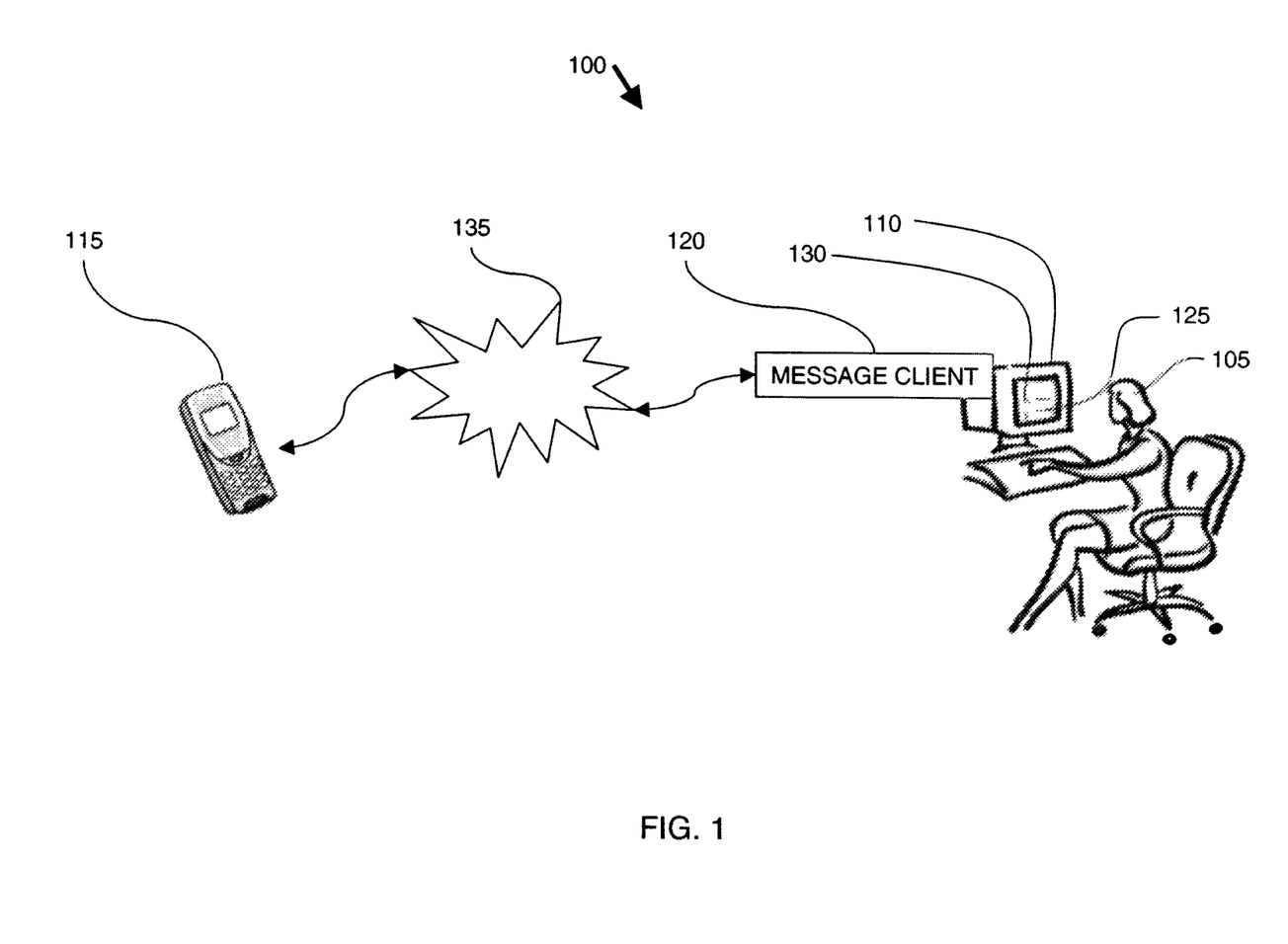
FIG. 1 shows a block diagram of a system suitable for practicing the disclosed embodiments.

FIG. 1 shows a block diagram of a system 100 suitable for practicing the embodiments disclosed herein. Although the presently disclosed embodiments will be described with reference to the drawings, it should be understood that they may be embodied in many alternate forms. It should also be understood that in addition, any suitable size, shape or type of elements or materials could be used.

The disclosed embodiments generally allow a user 105 of a computing device 110 to selectively determine delivery report options for a particular recipient 115. A computing device may include any device capable of sending and receiving messages, including a mobile phone, personal computer, personal digital assistant (PDA), pager, etc. Delivery reports may include delivery confirmation that a message has been received by the device to which it was sent, or an indication that a particular device is available, that is, turned on and available to receive a message. In one embodiment, a delivery report may be generated in the event that a message has not been delivered within a specified time period. While messages are described in the context of email or short message service messages, it should be understood that a message may include any communication between two or more devices, including text, voice, image, video, or multimedia communications. A recipient, also referred to as a contact, may include a recipient of a message, or a group of recipients, for example, a mailing list, distribution list, caller group, etc. A computing device may have multiple groups of recipients and a recipient may be a member of multiple groups.

The disclosed embodiments allow a user to take advantage of known information about specific contacts and thus personalize delivery report functionality for each contact or group of contacts to fit the user's needs. For example, a user may most likely know if a most used message recipient is likely to be available or have their device on for extended periods, thus decreasing the need for delivery reports for this contact. Similarly, a user is also likely to know if a contact resides or travels in areas with limited network access, thus increasing the need for delivery reports for this contact. In addition, messages to a particular user may be particularly important, for example, messages to a business contact may always require delivery reports. In one embodiment, the delivery report options for a particular contact may be maintained regardless of a global setting for delivery reports.

Referring again to FIG. 1, the user 105 may initiate a messaging application using, for example, a messaging client 120 on computing device 110. The computing device 110 may be, for example, a personal computer or other device having massaging capabilities. When the user defines a new contact 125, the user may be presented with delivery report options 130. Alternately, the first time a message is constructed for the new contact 125, the user may be presented with a menu of delivery report options 130 from which to select. As another alternate, each time a message is constructed for the contact 125, the user may be presented with a menu of delivery report options. A user may also access a menu for the contact 125 at any time subsequent to creating the contact to change the delivery report options 130 associated with the contact 125. When a message for the contact has been constructed it may be sent to the device 115 designated by information associated with contact 125 through network 135.

Figure 2:
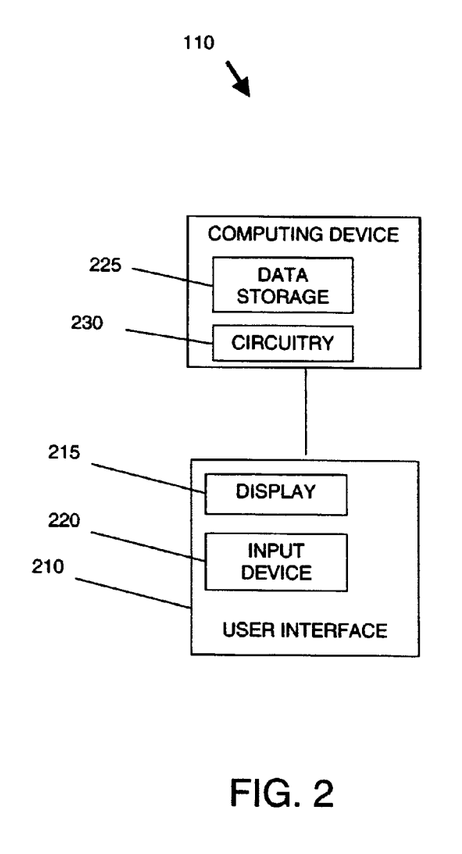
FIG. 2 shows an exemplary embodiment of a computing device for utilizing the disclosed embodiments.

FIG. 2 shows an exemplary embodiment of computing device 110. Computing device 110 may include a user interface 210 including a display 215 and an input device 220. Computing device 110 may also have data storage 225 for storing machine readable program source code which is adapted to cause computing device 110 to perform the operations and methods disclosed herein. Computing device 110 may also have circuitry 230 for performing various functions in hardware.

As mentioned above, computing device 110 is generally equipped to exchange messages with other devices and to provide a user with various options for delivery reports, in particular the ability to customize delivery reports for individual contacts or groups of contacts as described herein. Computing device 110 may have routines included in the machine readable program source in data storage 225 for performing the functions described herein. In addition, computing device 110 may utilize circuitry 130 either alone or in combination with the routines to perform the functions embodied herein. As such, the computing device 110 may include the messaging client 120 (FIG. 1) as part of the machine readable program source in data storage 225 for defining a contact for receiving messages from the computing device 110. The computing device may utilize the display 215 for providing delivery report options individually for the contact. In addition, the computing device may operate to maintain the delivery report options for the contact regardless of a global setting for delivery reports in the computing device.

Figure 3A:
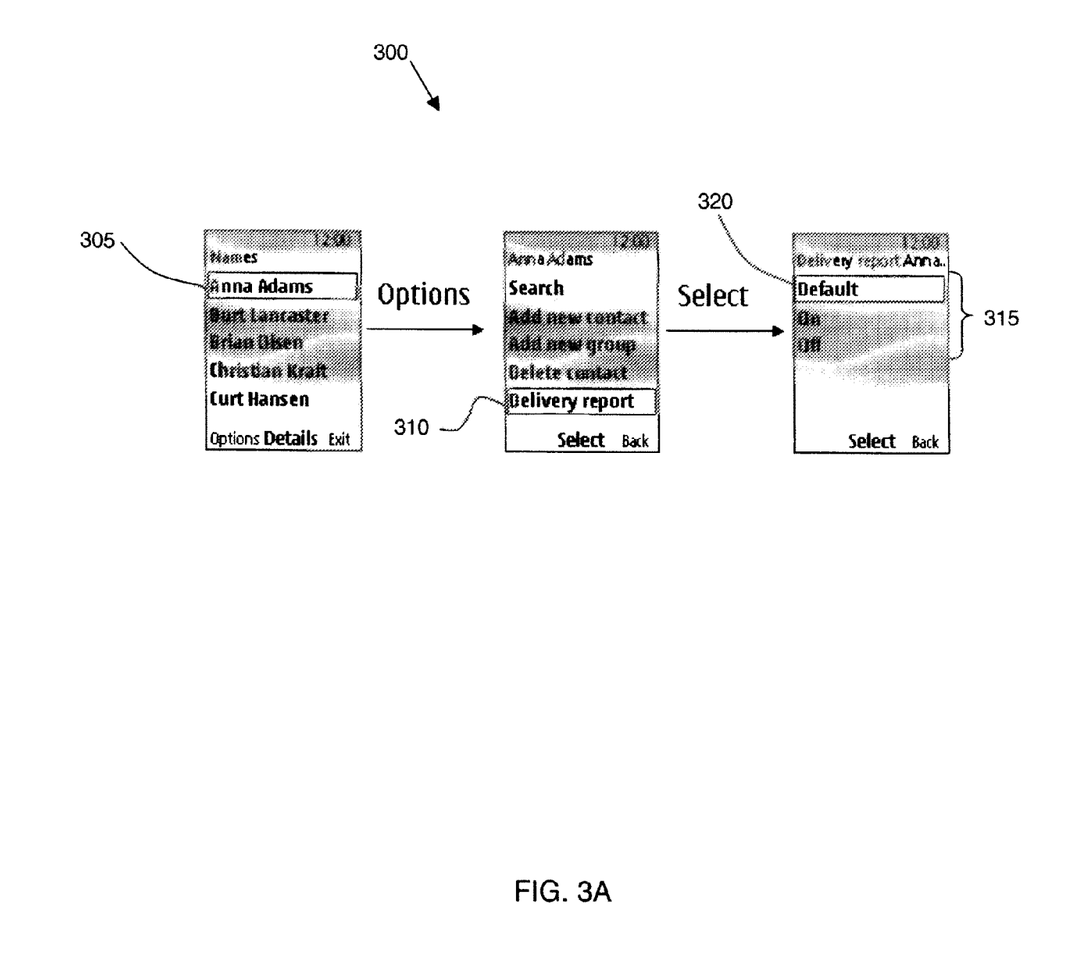
FIGS. 3A and 3B show an exemplary embodiment of a user interface for use with the disclosed embodiments.
Figure 3B:
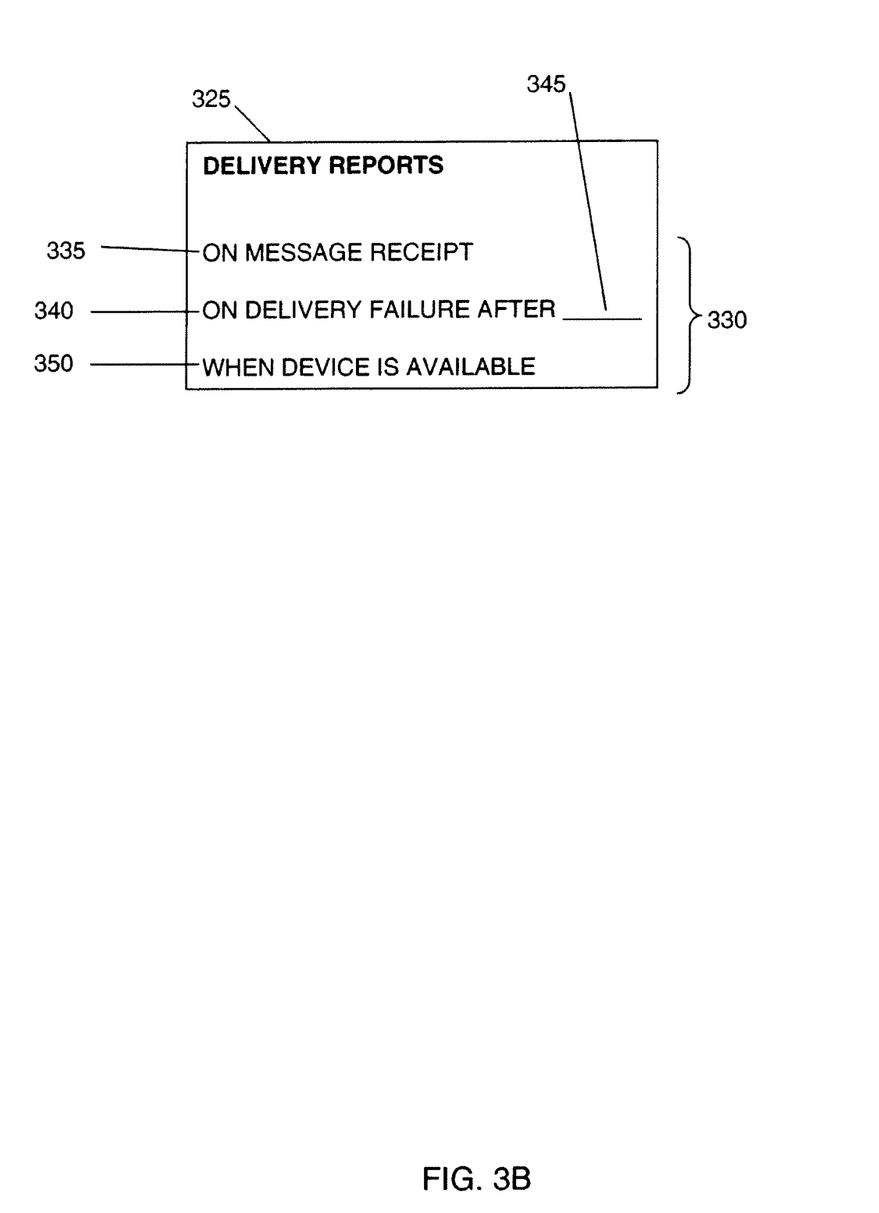

FIGS. 3A and 3B show an exemplary user interface embodiment 300 for performing the functions described herein. A user has selected either an existing contact or a new contact 305 for which delivery report options may be selected. After navigating to an options menu, the user may select Delivery Report 310. The user may then be presented with a number of options 315. In this example, the user is presented with "ON," "OFF," and "DEFAULT" selections.

The user may choose "DEFAULT" which will cause delivery reports for the contact to follow a general, or global delivery report setting, or the user may switch the delivery reports ON or OFF for the specific contact. When the setting is ON, all messages to that contact will result in a delivery report. With the setting "OFF," no delivery reports will be generated for this contact, even if the general or global setting for the computing device is set to "ON". As mentioned above, a user may also define delivery report options for groups of contacts.

FIG. 3B shows an exemplary menu 325 that may be presented to a user upon selection of the delivery reports "ON" option. After selecting delivery reports "ON" the user may also be provided with further selections 330, for example, receiving a delivery report upon delivery 335, receiving a delivery report upon a delivery failure 340 after a specified time period 345, or receiving a delivery report upon a device being turned on or otherwise becoming available 350.

Figure 4:
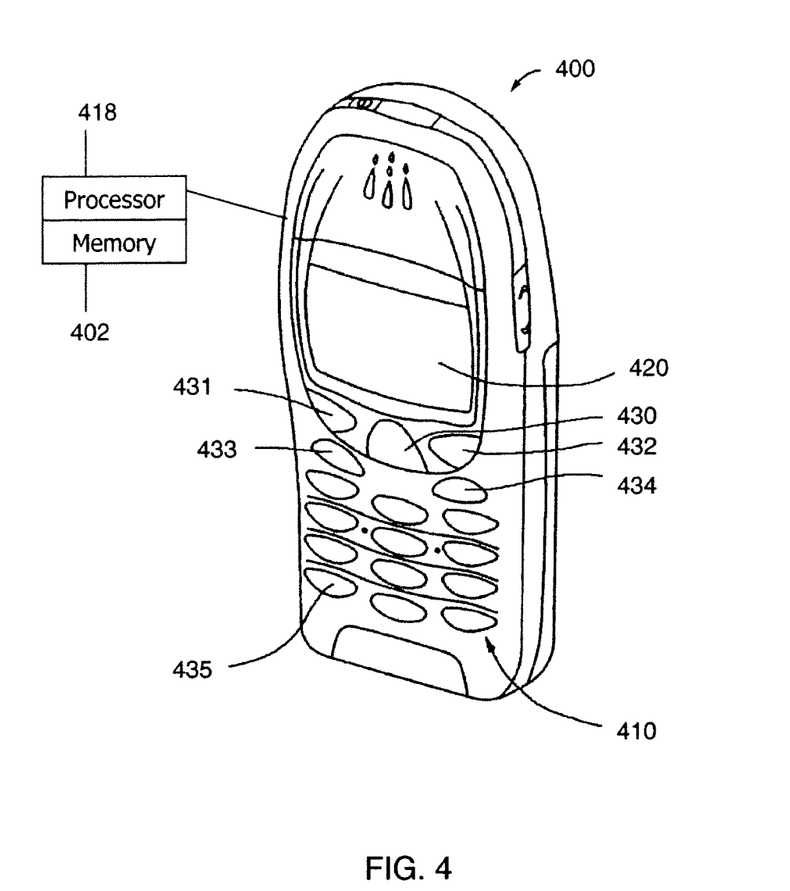
FIG. 4 shows an illustration of an exemplary mobile device suitable for practicing the disclosed embodiments.

FIG. 4 illustrates another system suitable for practicing the disclosed embodiments. The system of FIG. 4 is embodied as a mobile terminal or communications device 400. The terminal or mobile communications device 400 may have a keypad 410 and a display 420. The keypad 410 may include any suitable user input devices such as, for example, a multi-function/scroll key 430, soft keys 431, 432, a call key 433 and end call key 434 and alphanumeric keys 435. The display 420 may be any suitable display, such as for example, a touch screen display or graphical user interface. The display may be integral to the mobile communications device 400 or the display may be a peripheral display connected to the device 400. A pointing device, such as for example, a stylus, pen or simply the user's finger may be used with the display 420. In alternate embodiments any suitable pointing device may be used. In other alternate embodiments, the display may be a conventional display.

The mobile communications device 400 may also include other suitable features such as, for example, a camera, loud speaker, connectivity port or tactile feedback features. The mobile communications device 400 may have a processor 418 for coordinating the operations of the mobile communications device and for processing user inputs and displaying information on the display 420. A memory 402 may be connected to the processor 418 for storing machine readable program source code adapted to cause device 400 to perform the operations and methods disclosed herein. Memory 402 may also store any suitable information, applications, or programs associated with the mobile communications device 400 such as phone book entries, calendar entries, a web browser, an e-mail client, etc.

Similar to the operations of computing device 110 above, mobile communications device 400 may generally be equipped to to exchange messages with other devices and to provide a user with various options for delivery reports, in particular the ability to customize delivery reports for individual contacts or groups of contacts as described herein.

Figure 5:
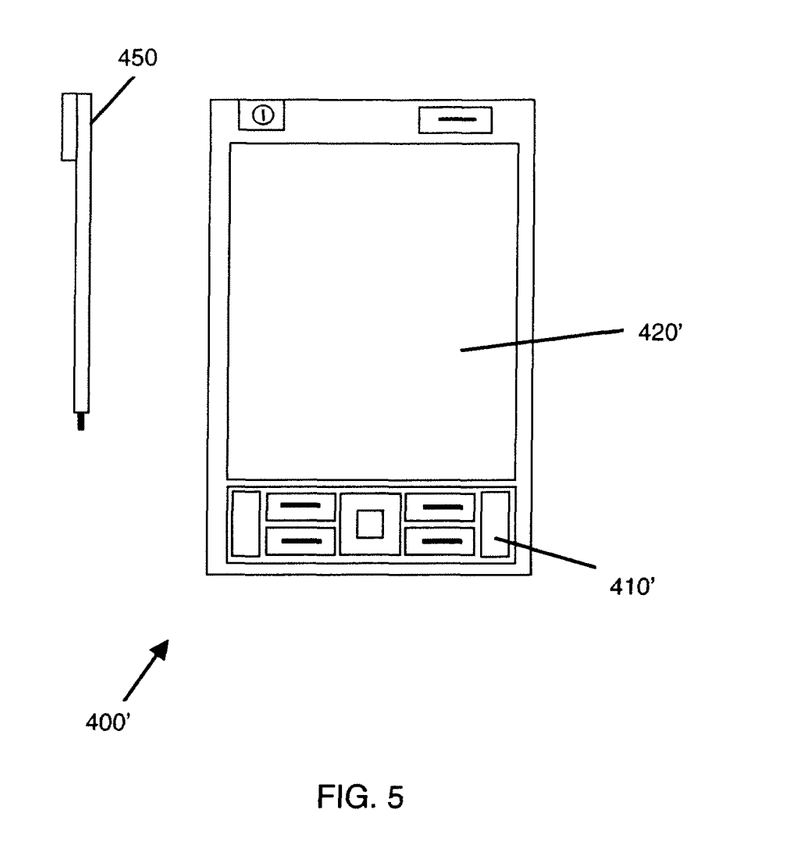
FIG. 5 shows a block diagram of another exemplary mobile device suitable for practicing the disclosed embodiments.

Another system suitable for practicing the disclosed embodiments may be embodied as a PDA style device 400' illustrated in FIG. 5. The PDA 400' may have a keypad 410', a touch screen display 420' and a pointing device 450 for use on the touch screen display 420'. In still other alternate embodiments, the device may be a personal communicator, a tablet computer, a laptop or desktop computer, a television or television set top box or any other suitable device capable of containing the display 420 and supported electronics such as the processor 401 and memory 402.

Figure 6:
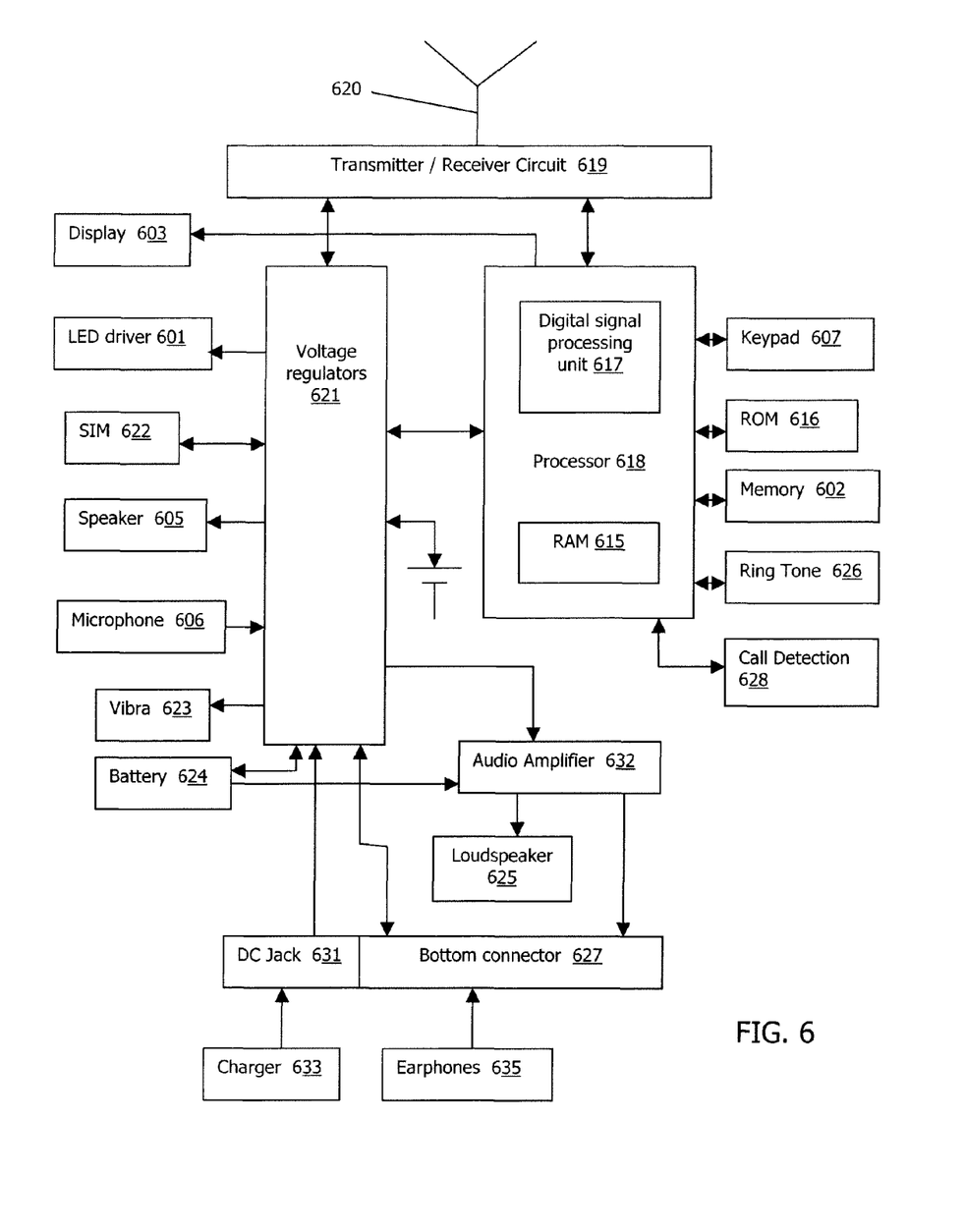
FIG. 6 is a block diagram illustrating the general architecture of the exemplary mobile devices of FIGS. 4 and 5.

FIG. 6 illustrates in block diagram form one embodiment of a general architecture of the mobile devices 400, 400'. The mobile communications device 400, 400' may have a processor 618 for controlling the operations of the mobile device, processing user inputs, and displaying information on display 603. The processor 618 may include an integrated digital signal processor 617 and an integrated RAM 615. The processor 618 controls communication with a wireless network via a transmitter/receiver circuit 619 and an antenna 620.

For voice communication, a microphone 606 is coupled to the processor 618 via voltage regulators 621 that transform the user's speech into analog signals. The analog signals converted to digital signals by an A/D converter (not shown) which are then encoded by the digital signal processor 617 in the processor 618. The encoded speech signal is transferred to the processor 618, which e.g. supports, for example, GSM terminal software. The encoded signals are then transmitted to another device by transmitter/receiver circuit 619. Encoded signals from another device are received by transmitter/receiver circuit 619. Digital signal-processing unit 617 speech-decodes the received signals, which are transferred from the processor 618 to the speaker 605 via a D/A converter (not shown). The speaker then reproduces the sounds from the received signals.

The voltage regulators 621 form the interface for the speaker 605, the microphone 606, the LED drivers 601 (for the LEDS backlighting the keypad 607 and the display 603), the SIM card 622, battery 624, the bottom connector 627, the DC jack 631 (for connecting to the charger 633) and the audio amplifier 632 that drives the (hands-free) loudspeaker 625.

The processor 618 may also include or connect to memory 602 for storing any suitable information and/or applications associated with the mobile communications device 400, 400' such as phone book entries, calendar entries, etc.

The processor 618 also forms the interface for peripheral units of the device, such as for example, a (Flash) ROM memory 616, the graphical display 603, the keypad 607, a ringing tone selection unit 626, and an incoming call detection unit 628. In alternate embodiments, any suitable peripheral units for the device 400, 400' can be included.

The software in the RAM 615 and/or in the flash ROM 616 includes instructions for the processor 618 to perform a plurality of different applications and functions. In particular, the applications and functions may include the embodiments disclosed herein, including exchanging messages with other devices and providing a user with various options for delivery reports, in particular the ability to customize delivery reports for individual contacts or groups of contacts as described herein.

Figure 7:
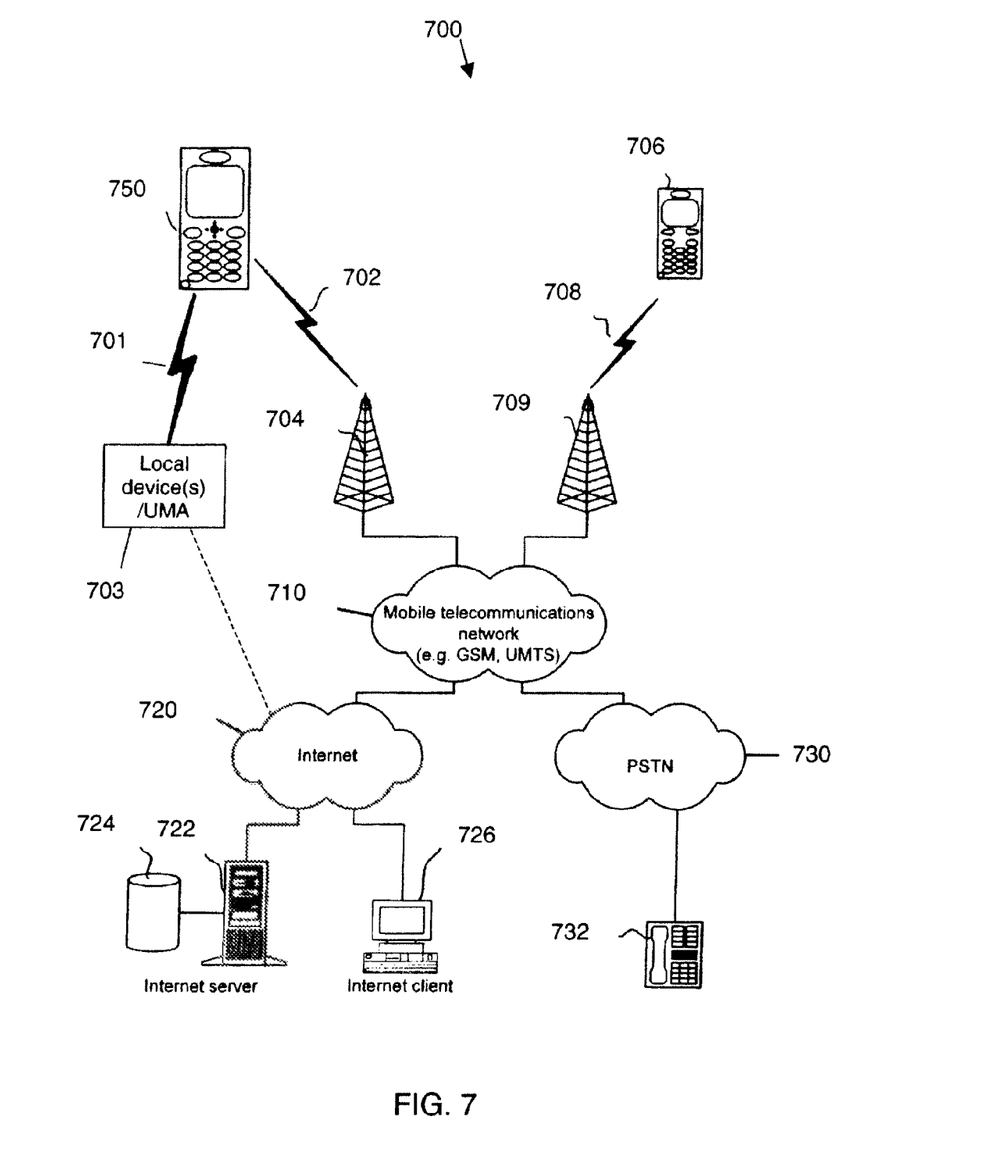
FIG. 7 illustrates one example of a schematic diagram of a communications system in which aspects of the disclosed embodiments may be practiced.

FIG. 7 illustrates an embodiment of a communication system 700 in which the disclosed embodiments may be used. In the communication system 700 of FIG. 7, various telecommunications services such as cellular voice calls, www/wap browsing, cellular video calls, data calls, facsimile transmissions, music transmissions, still image transmission, video transmissions, electronic message transmissions and electronic commerce may be performed between the mobile terminal 750 and other devices, such as another mobile terminal 706, a stationary telephone 732, or an internet server 722. It is to be noted that for different embodiments of the mobile terminal 750 and in different situations, different ones of the telecommunications services referred to above may or may not be available. The aspects of the disclosed embodiments are not limited to any particular set of services in this respect.

Mobile terminals 750, 706 may be similar to and have the same capabilities as mobile terminals 400, 400' described above. The mobile terminals 750, 706 may be connected to a mobile telecommunications network 710 through radio frequency (RF) links 702, 708 via base stations 704, 709. The mobile telecommunications network 710 may be in compliance with any commercially available mobile telecommunications standard such as, for example, GSM, UMTS, D-AMPS, CDMA2000, FOMA and TD-SCDMA or other such suitable communication standard or protocol.

The mobile telecommunications network 710 may be operatively connected to a wide area network 720, which may be the Internet or a part thereof. An Internet server 722 has data storage 724 and can be connected to the wide area network 720, as is for example, an Internet client computer 726. The server 722 may host a www/wap server capable of serving www/wap content to the mobile terminals 750, 706. In alternate embodiments, the server 722 can host any suitable transaction oriented protocol. For example, a public switched telephone network (PSTN) 730 may be connected to the mobile telecommunications network 710 in a familiar manner. Various telephone terminals, including the stationary telephone 732, may be connected to the PSTN 730.

The mobile terminal 750 may also be capable of communicating locally via a local link 701 to one or more local devices 703. The local link 701 may be any suitable type of link with a limited range, such as for example Bluetooth, a Universal Serial Bus (USB) link, a wireless Universal Serial Bus (WUSB) link, an IEEE 802.11 wireless local area network (WLAN) link, an RS-232 serial link, etc. The local devices 703 may, for example, be various sensors that can communicate measurement values to the mobile terminal 750 over the local link 701. The above examples are not intended to be limiting, and any suitable type of link may be utilized. The local devices 703 may be antennas and supporting equipment forming a WLAN implementing Worldwide Interoperability for Microwave Access (WiMAX, IEEE 802.16), WiFi (IEEE 802.11x) or other communication protocols. The WLAN may be connected to the internet. The mobile terminal 750 may thus have multi-radio capability for connecting wirelessly using mobile communications network 710, WLAN or both. Communication with the mobile telecommunications network 710 may also be implemented using WiFi, WiMax, or any other suitable protocols, and such communication may utilize unlicensed portions of the radio spectrum (e.g. unlicensed mobile access (UMA)).

As implemented in any of mobile terminals 750, 706, or Internet client 726, the present embodiments include the capability to exchange messages with other devices and to provide a user with various options for delivery reports, in particular the ability to customize delivery reports for individual contacts or groups of contacts as described herein.

Figure 8:
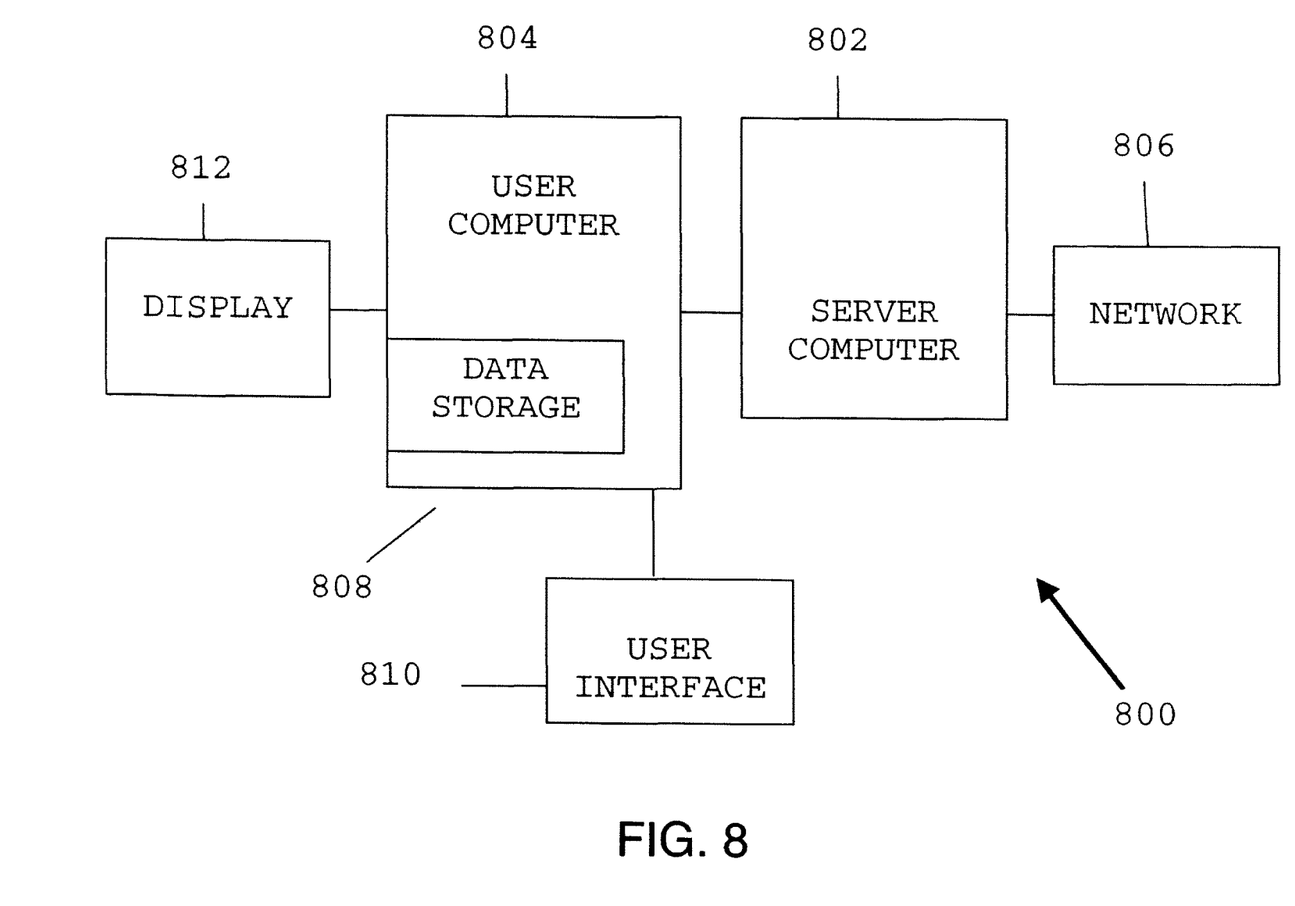
FIG. 8 illustrates a block diagram of an example of an apparatus incorporating features that may be used to practice aspects of the disclosed embodiments.

The disclosed embodiments may also include software and computer programs incorporating the process steps and instructions described above that are executed in different computers. FIG. 8 is a block diagram of one embodiment of a typical apparatus 800 incorporating features that may be used to practice aspects of the disclosed embodiments. As shown, a computer system 802 may be linked to another computer system 804, such that the computers 802 and 804 are capable of sending information to each other and receiving information from each other. In one embodiment, computer system 802 could include a server computer adapted to communicate with a network 806. Computer systems 802 and 804 can be linked together in any conventional manner including, for example, a modem, hard wire connection, or fiber optic link. Generally, information can be made available to both computer systems 802 and 804 using a communication protocol typically sent over a communication channel or through a dial-up connection on ISDN line.

Computers 802 and 804 are generally adapted to utilize program storage devices embodying machine readable program source code which is adapted to cause the computers 802 and 804 to perform the method steps disclosed herein. The program storage devices incorporating aspects of the disclosed embodiments may be devised, made and used as a component of a machine utilizing optics, magnetic properties and/or electronics to perform the procedures and methods disclosed herein. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 802 and 804 may also include a microprocessor for executing stored programs. Computer 802 may include a data storage device 808 on its program storage device for the storage of information and data. The computer program or software incorporating the processes and methods incorporating aspects of the disclosed embodiments may be stored in one or more computers 802 and 804 on an otherwise conventional program storage device. In one embodiment, computers 802 and 804 may include a user interface 810, and a display interface 812 from which aspects of the disclosed embodiments may be accessed. The user interface 810 and the display interface 812 can be adapted to allow the input of queries and commands to the system, as well as present the results of the commands and queries.

The disclosed embodiments allow a user to customize delivery report functionality for each contact or group of contacts, and to tailor delivery reports based on the user's needs or the importance of messages sent to a particular contact. Delivery reports may include delivery confirmation that a message has been received by the device to which it was sent, or an indication that a particular device is turned on and available to receive a message. Furthermore, delivery report options for the individual contact are maintained regardless of a global setting for delivery reports in the computing device.

It should be understood that the foregoing description is only illustrative of the present embodiments. Various alternatives and modifications can be devised by those skilled in the art without departing from the embodiments disclosed herein. Accordingly, the embodiments are intended to embrace all such alternatives, modifications and variances which fall within the scope of the appended claims.

What is claimed is:

1. A method comprising:
   selecting a global delivery report setting in which delivery reports are either on or off for all email messages;
   selecting a contact from a list of available contacts;
   presenting options for receiving delivery reports for email messages sent to the selected contact, said options comprising:
   defaulting to a global delivery report setting;
   selecting not to receive delivery reports which overrides the global delivery report setting; and
   selecting to receive delivery reports which overrides the global delivery report setting; and
   providing, in response to selecting to receive delivery reports for the selected contact, further options relating to events that trigger a delivery report.

2. The method of claim 1, wherein the contact includes a group of message recipients.

3. The method of claim 1, wherein the delivery report further options include receiving a delivery report upon delivery.

4. The method of claim 1, wherein the delivery report further options include receiving a delivery report upon a failure to deliver after a specified time period.

5. The method of claim 1, further comprising selecting delivery report options individually for the selected contact the first time a message is constructed for the contact.

6. The method of claim 1, further comprising selecting delivery report options individually for the selected contact each time a message is constructed for the contact.

7. An apparatus comprising:
   a client for selecting a global delivery report setting in which delivery reports are either on or off for all email messages;
   a messaging client for defining a contact from a list of available contacts;
   a display for presenting options for receiving delivery reports for messages sent to the selected contact, said options comprising:
   defaulting to a global delivery report setting;
   selecting not to receive delivery reports which overrides the global delivery report setting; and
   selecting to receive delivery reports which overrides the global delivery report setting; and
   providing, in response to selecting to receive delivery reports for the selected contact, further options relating to events that trigger a delivery report.

8. The apparatus of claim 7, wherein the contact includes a group of message recipients.

9. The apparatus of claim 7, wherein the delivery report further options include receiving a delivery report upon delivery.

10. The apparatus of claim 7, wherein the delivery report further options include receiving a delivery report upon a failure to deliver after a specified time period.

11. The apparatus of claim 7, wherein the computing device operates to present delivery report options individually for the selected contact the first time a message is constructed for the contact.

12. The apparatus of claim 7, wherein the computing device operates to present delivery report options individually for the selected contact each time a message is constructed for the contact.

13. An apparatus comprising:
   means for selecting a global delivery report setting in which delivery reports are either on or off for all email messages;
   means for selecting a contact from a list of available contacts;
   means for presenting options for receiving delivery reports for email messages sent to the selected contact, said options comprising:
   defaulting to a global delivery report setting;
   selecting not to receive delivery reports which overrides the global delivery report setting; and
   selecting to receive delivery reports which overrides the global delivery report setting; and
   providing, in response to selecting to receive delivery reports for the selected contact, further options relating to events that trigger a delivery report.

14. The apparatus of claim 13, wherein the contact includes a group of message recipients.

15. The apparatus of claim 13, wherein the delivery report further options include receiving a delivery report upon delivery.

16. The apparatus of claim 13, wherein the delivery report further options include receiving a delivery report upon a failure to deliver after a specified time period.

17. The apparatus of claim 13, further comprising means for presenting delivery report options individually for the selected contact the first time a message is constructed for the contact.

18. The apparatus of claim 13, further comprising means for presenting delivery report options individually for the selected contact each time a message is constructed for the contact.

19. A user interface comprising:
   an input device and a data storage for storing machine readable program source code adapted to cause a computing device to perform certain operations, said computing device comprising:
   a client embodied in said stored source code for selecting a global delivery report setting in which delivery reports are either on or off for all email messages;
   a messaging client embodied in said stored source code for selecting a contact from a list of available contacts;
   a display of the computing device for presenting options for receiving delivery reports for email messages sent to the selected contact, said options comprising:
   defaulting to a global delivery report setting;
   selecting not to receive delivery reports which overrides the global delivery report setting; and
   selecting to receive delivery reports which overrides the global delivery report setting; and a client for providing in response to selecting to receive delivery reports, further options relating to events that trigger a delivery report.

20. The user interface of claim 19, wherein the contact includes a group of message recipients.

21. The user interface of claim 19, wherein the delivery report further options include receiving a delivery report upon delivery.

22. The user interface of claim 19, wherein the delivery report further options include receiving a delivery report upon a failure to deliver after a specified time period.

23. The user interface of claim 19, wherein the computing device operates to present delivery report options individually for the selected contact the first time a message is constructed for the contact.

24. The user interface of claim 19, wherein the computing device operates to present delivery report options individually for the selected contact each time a message is constructed for the contact.

25. A non-transitory computer useable medium having computer readable code embodied therein for causing a computing device to present information, the computer readable code in the computer program product comprising:
   computer readable program code for selecting a global delivery report setting in which delivery reports are either on or off for all email messages;
   computer readable program code for selecting a contact from a list of available contacts; and
   computer readable program code for presenting options for receiving delivery reports for messages sent to the selected contact, said options comprising:
      defaulting to a global delivery report setting;
      selecting not to receive delivery reports which overrides the global delivery report setting; and
      selecting to receive delivery reports which overrides the global delivery report setting; and
   providing, in response to selecting to receive delivery reports for the selected contact, further options relating to events that trigger a delivery report.

26. The non-transitory computer usable medium of claim 25, further comprising computer readable program code for presenting delivery report options individually for the selected contact the first time a message is constructed for the contact.

27. The non-transitory computer usable medium of claim 25, further comprising computer readable program code for presenting delivery report options individually for the selected contact each time a message is constructed for the contact.

28. A method for sending electronic messages, comprising:
   setting a global default delivery report protocol for email message sent from the device;
   maintaining a first group of contacts, wherein:
      each contact in the first group of contacts has a corresponding individual contact delivery report protocol, and
      the corresponding individual contact delivery report protocol is an option selected from a group including: do not provide a delivery report, provide a delivery report, or defer to the global default delivery report protocol;
   creating an email message addressed to at least one addressee;
   setting a message delivery report protocol for each individual addressee of the email message, comprising:
      when the individual addressee is in the first group of contacts, setting the message delivery report protocol for the message to that individual addressee at the corresponding individual delivery report protocol;
      when the individual addressee is not on the first group of contacts, setting the message delivery report protocol for the message to that individual addressee at the global delivery report protocol;
   sending the electronic message to each of the at least one addressee consistent with the message delivery protocol for the corresponding at least one addressee set by the setting.

29. The method of claim 28, wherein when the at least one addressee includes a first addressee and a second addressee, the message delivery report protocol for the first addressee is provide a delivery report and the message delivery report protocol for the second address is do not provide a delivery report, the sending further comprises:
   sending the electronic message to the first address with a delivery report requirement; and
   sending the electronic message to the second addressee without a delivery report requirement.

30. The method of claim 28, wherein between the creating and the setting, the method further comprises:
   providing, for an addressee of the at least one addressee that is not in the first group of contacts, an option to associate an individual contact delivery report protocol with an addressee of the at least one addressee that is not in the first group of contacts; and
   adding the addressee of the at least one addressee that is not in the first group of contacts into the first group of contacts.

* * * * *